US008052060B2

(12) United States Patent
Yacoub et al.

(10) Patent No.: US 8,052,060 B2
(45) Date of Patent: Nov. 8, 2011

(54) PHYSICAL ACCESS CONTROL SYSTEM WITH SMARTCARD AND METHODS OF OPERATING

(75) Inventors: Khalil W. Yacoub, Boca Raton, FL (US); Anshuman Sinha, Boca Raton, FL (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 536 days.

(21) Appl. No.: 12/238,131

(22) Filed: Sep. 25, 2008

(65) Prior Publication Data

US 2010/0077474 A1 Mar. 25, 2010

(51) Int. Cl.
*G06K 19/05* (2006.01)

(52) U.S. Cl. ........................................ 235/492; 235/382

(58) Field of Classification Search .................. 235/492, 235/487, 382, 385, 380
See application file for complete search history.

(56) References Cited

U.S. PATENT DOCUMENTS

| | | | | |
|---|---|---|---|---|
| 6,776,332 | B2 * | 8/2004 | Allen et al. | 235/380 |
| 6,876,757 | B2 | 4/2005 | Yau et al. | |
| 7,007,852 | B2 | 3/2006 | Silverbrook et al. | |
| 7,083,090 | B2 | 8/2006 | Zulli | |
| 7,111,165 | B2 | 9/2006 | Liden et al. | |
| 7,124,943 | B2 | 10/2006 | Quan et al. | |
| 7,180,403 | B2 | 2/2007 | Quan | |
| 7,269,844 | B2 | 9/2007 | Elteto et al. | |
| 7,287,702 | B2 | 10/2007 | Silverbrook et al. | |
| 7,379,921 | B1 | 5/2008 | Kiliccote | |
| 7,392,395 | B2 | 6/2008 | Ginter et al. | |
| 7,464,862 | B2 * | 12/2008 | Bacastow | 235/380 |
| 7,539,649 | B2 * | 5/2009 | Guthery | 705/67 |
| 2007/0174907 | A1 | 7/2007 | Davis | |
| 2007/0290051 | A1 | 12/2007 | Bielmann | |
| 2008/0163361 | A1 | 7/2008 | Davis | |

FOREIGN PATENT DOCUMENTS

| | | | |
|---|---|---|---|
| EP | 1024239 | A1 | 8/2000 |
| EP | 1562153 | A2 | 8/2005 |
| EP | 1755074 | A1 | 2/2007 |
| WO | 2006021047 | A1 | 3/2006 |
| WO | 2007100709 | A2 | 9/2007 |

OTHER PUBLICATIONS

PCT International Search Report issued in connection with corresponding PCT Application No. PCT/US2009/054985 on Nov. 4, 2009.

* cited by examiner

*Primary Examiner* — Daniel St.Cyr
(74) *Attorney, Agent, or Firm* — Kinney & Lange, P.A.

(57) ABSTRACT

An improved physical access control system has an online portion and an offline portion. A smartcard is configurable to transport access control information between the online portion and offline portion. The smartcard is further configurable to receive an offline reader identifier from an offline reader, and to control access of the smartcard holder to an offline entry/exit point. The smartcard is further configurable to carry a revoked list that is transmitted to each offline reader accessed. Methods of operating the improved physical access control system are also disclosed.

15 Claims, 12 Drawing Sheets

PHYSICAL ACCESS CONTROL SYSTEM WITH SMARTCARD AND METHODS OF OPERATING

BACKGROUND

1. Field of the Invention

The field of the invention relates to access control systems generally, and more particularly to certain new and useful advances in offline smart-card readers and their integration with a networked physical access control system ("PACS") via one or more smartcards, of which the following is a specification, reference being had to the drawings accompanying and forming a part of the same.

2. Discussion of Prior Art

Traditionally, a PACS has been either online or offline. An online, or networked, PACS stores an individual's access privileges in a database on single or multiple controllers, which are connected to credential reading devices (e.g., "reader" or "reader/writer") that control access to entry/exit points, such as doors. An online PACS is typically deployed in situations where access control privileges change often with time, and in situations where access control of a facility needs to be as strong and secure as possible.

FIG. 1 illustrates the conventional interaction of two conventional PACS—an online (or networked) PACS 116 and an offline PACS 118. The online PACS 116 includes a computer (or server) 102 that hosts a master database 103 containing one or more smartcard identifiers 211 and access privilege information associated with each of the smartcard identifiers 211. Any of the one or more smartcard identifiers 211 and the access privilege information associated therewith can be added, deleted, and/or modified by a user of the computer 102. A host-controller (e.g., first) communication path 122 couples the computer 102 with a controller 104, which hosts a replicated master database 105. Smartcard readers 108 are coupled to the controller 104 by online reader-controller (e.g., second) communication paths 124, and are coupled with doors 112 by online reader-door (e.g., third) communication paths 126. Smartcard holders use the same smartcard 200 in the online access control portion 116 and the offline access control portion 118; but the smartcard 200 contains only a smartcard identifier 211 and does not contain any access privilege information associated with the smartcard identifier 211. Instead the access privilege information remains stored in the master database 103, in the replicated master database 105 on the controller 104, and in another copy 107 of the replicated master database 105 (or is a part of the master database 103) that is stored on an offline reader 106, which is coupled to an offline door 114 via an offline reader-door (e.g., fourth) communications path 130. A path 128 that the smartcard 200 follows as it moves between an online reader 108 in the online access control portion 116 and the offline reader 106 in the offline access control portion 118 is indicated by a dashed line. Arrow 120 indicates a directional flow of access control information, instructions, and computer programs.

FIG. 2 illustrates conventional types of data 210 typically stored on the conventional smartcard 200. These conventional types of data 210 include the smartcard identifier 211, other data 213, and smartcard programs, bytecode, and executable files 215, e.g., "executables" or "binaries". "Bytecode" refers to various forms of instruction sets designed for execution by a software interpreter, which can be further compiled into machine code. Bytecode can be executed directly on a virtual machine, e.g., interpreter, or further compiled into machine code for better performance. More compact than source code, bytecode allows better performance than interpreting source code directly. Most implementations of computer languages execute a program first by compiling the source code in bytecode, and by subsequently passing the bytecode to a virtual machine. In contrast to files that contain only data, "executable files" cause a computer to perform various tasks per encoded instructions. In operation the online PACS 116 pushes the access privilege information and decision-making capabilities to the one or more central controllers 104, each of which can be easily updated to incorporate changes made to the access control information stored on the computer 102. That said the controllers 104 are sometimes overloaded and therefore periodically unavailable for updating access control information.

The offline PACS 118 also pushes the access privilege information and decision-making capabilities to the offline reader 106, which is capable of reading the smartcard identifier 211 from a smartcard 200 when the smartcard 200 is presented. In the offline PACS 118, a copy of the replicated master database 105 containing each smartcard identifier 211 and its associated access privileges is stored at every entry/exit point, i.e., on each offline reader 106. Unlike the online readers 108 in the online PACS 116, each offline reader 106 is not connected to a central point or amongst each other. Consequently, updating access privilege information is difficult, since the requisite database (or firmware) modifications must be done manually for each and every offline reader 106.

SUMMARY OF THE INVENTION

Embodiments of an improved physical access control system ("PACS") and methods for operating the same are disclosed herein.

Embodiments of the invention address a long-standing problem, which is the need to manually update access control information at the PACS' offline entry/exit points. Embodiments of the invention also update the access control information of the offline portions of a PACS more frequently than is possible in a conventional PACS. Additionally, embodiments of the invention avoid the need to update offline access control information via controllers, which sometimes become overloaded. Embodiments of the invention also avoid the need to manually update each offline reader with updated copies of a replicated master database.

Embodiments of the invention also have other advantages including cost and ease of deployment. In terms of business, it translates to lower cost product for customers who have a few entry points offline, such as main gates, because it is not necessary to hardwire the readers that operate the offline entry points. Consequently such customers are able to inexpensively expand the area of a facility that employs access control features.

In contrast to the conventional PACS described above, embodiments of the invention are able to receive information about the operational status of a PACS' offline reader(s). Embodiments of the invention are also able to update a smartcard's credentials when the smartcard interacts with a PACS' online reader. Additionally embodiments of the invention provide a smartcard that is configurable to control access to an offline entry/exit point based on information read from an offline reader coupled with the offline entry/exit point.

In an embodiment, a PACS comprises an online (networked) portion, an offline portion, and a smartcard configurable to transfer information between the online portion and offline portion. The information to be transferred comprises at least one of access control information, credentials, and data from the offline portion of the PACS. The data from the offline portion of the PACS comprises transactional information and/or offline-reader status information.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

Figure 1:
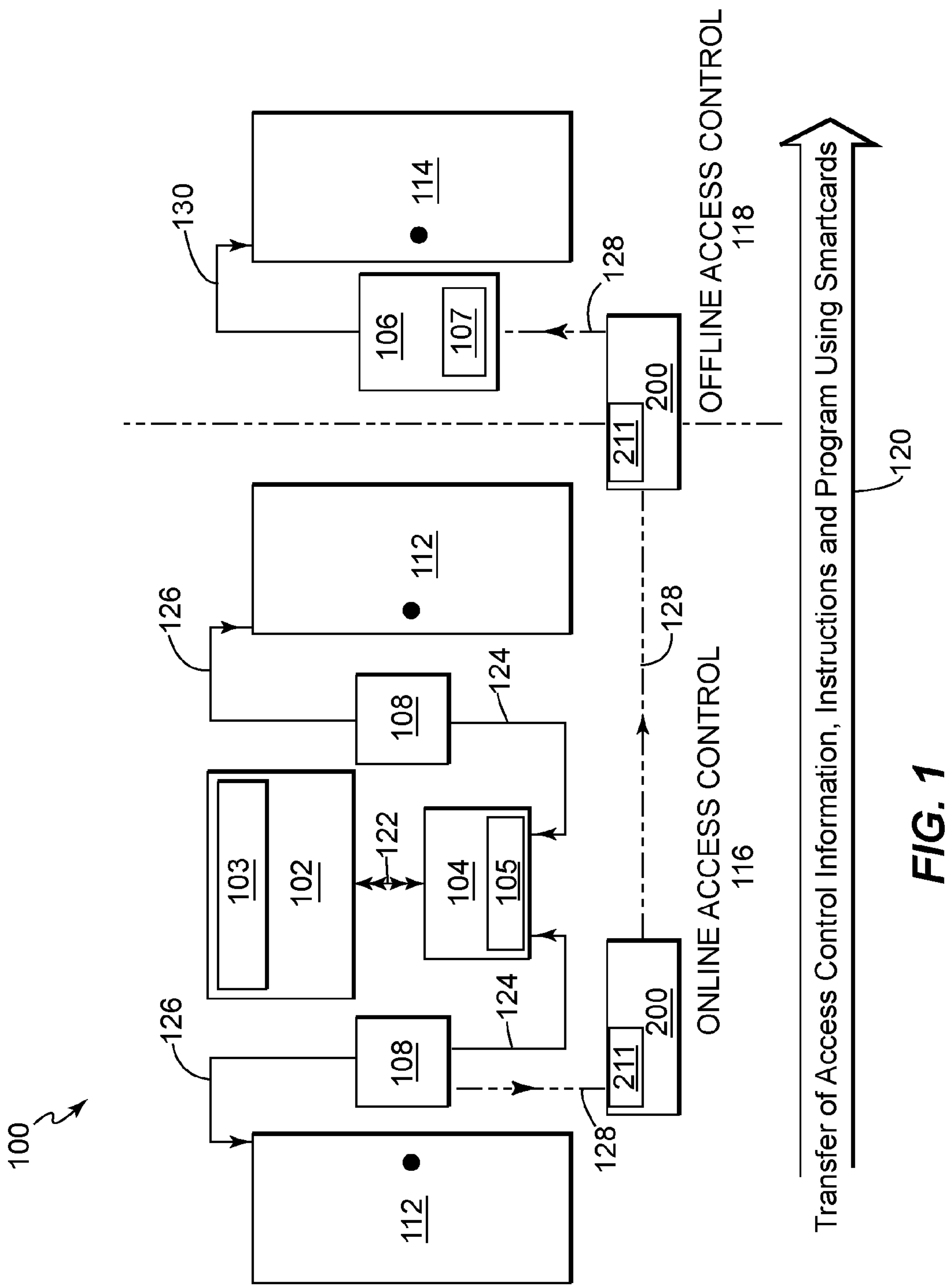
FIG. 1 (Prior Art)
FIG. 1 is a diagram illustrating an interaction between an online physical access control system ("PACS") and an offline PACS.
Figure 2:
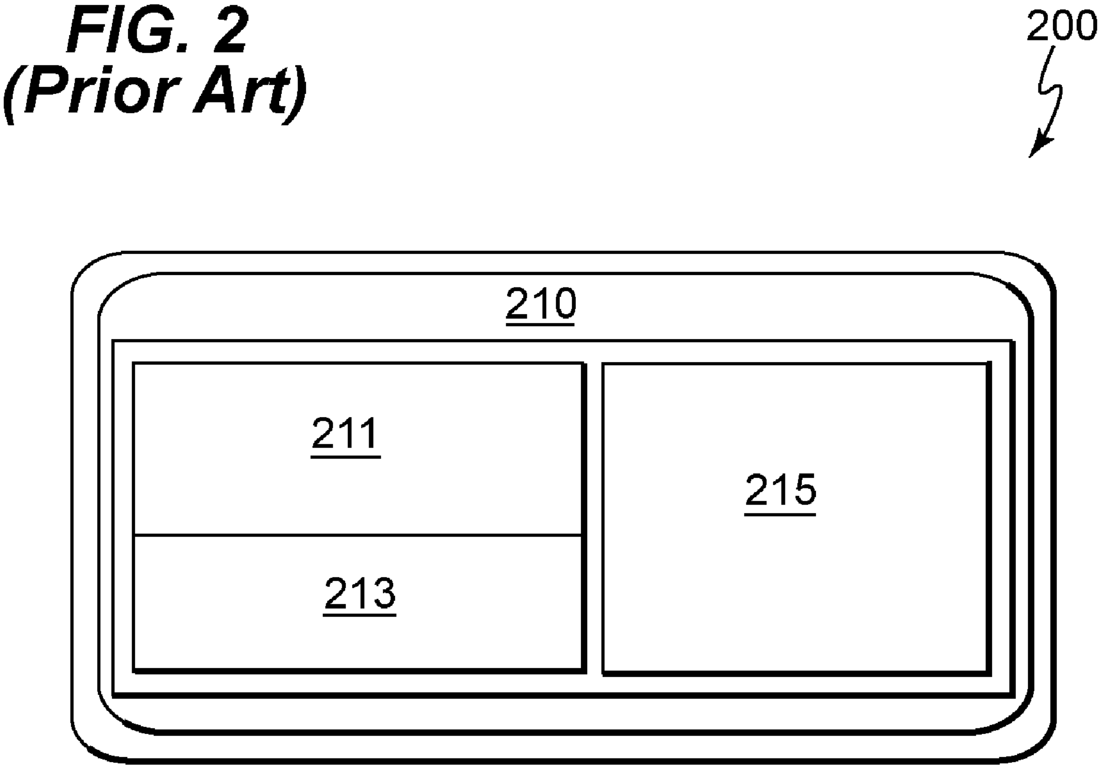
FIG. 2 (Prior Art)
FIG. 2 is a diagram illustrating types of data typically stored on a conventional smartcard.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Definitions

The term "smartcard" refers to a portable apparatus comprising a computer processor that is configurable to control (e.g., "grant or deny") access to an offline entry/exit point, to provide credentials to an online entry/exit point, and/or to store access control information and/or the credentials in a computer-readable memory.

"Access control information", comprises data such as, but not limited to: offline reader status information, timestamp information, a revoked list, reader instructions to grant or deny access to an entry/exit point (e.g., to unlock, lock, open, or close a door), and so forth. "Access control information" also comprises data such as, but not limited to, new or updated programs, byte codes, assemblies, scripts, and executables that are unique to a facility for which a PACS is implemented.

An "assembly" is a partially compiled code library for use in deployment, versioning and security in the Microsoft .NET framework.

"Credential information", e.g., "credentials," refers to a smartcard holder identifier (e.g., "badge id") and/or to the access privileges associated therewith that are unique to a given smartcard holder for a section of the facility or the whole of the facility. A non-limiting example of "credentials" is a physical access control list containing an offline reader identifier, a smartcard holder identifier, and one or more access privileges associated therewith.

The term "door" refers to any type of barrier used to control access through an entry/exit point.

An offline "reader identifier" is a set of alphabetic, numeric, or alphanumeric characters, which is uniquely associated with an offline reader of a PACS. An online "reader identifier" is a set of alphabetic, numeric, or alphanumeric characters, which is uniquely associated with an online reader of a PACS. A reader can have different schemes to code its unique "reader identifier." That way of example, and not limitation, a reader identifier may comprise one or more of the following elements:

an organization identifier;
a country/region identifier;
a city/county identifier;
a facility identifier;
a facility identifier; and
a door identifier.

The facility identifier may comprise a building identifier and/or a zone identifier. Various combinations of any of the above listed elements are possible. One non-limiting example of such a reader identification scheme is shown below.

OrgID.CountryID.CityID.Facility-ID.SubfacilityID.ZoneID.DoorID.
0001.1234.787.8.0.1.25

TABLE 1

Exemplary Reader Identification Scheme

| S. No. | Sub Identifier | Value |
|---|---|---|
| 1 | OrgID | 0001 |
| 2 | CountryID | 1234 |
| 3 | CityID | 787 |
| 4 | FacilityID | 8 |
| 5 | SubfacilityID | 0 |
| 6 | ZoneID | 1 |
| 7 | DoorID | 25 |

A "smartcard holder identifier" comprises a set of alphabetic, numeric, or alphanumeric characters, which is uniquely associated with a smartcard holder of a PACS. Any suitable smartcard holder identification scheme can be used.

The term "smartcard holder" refers primarily to a person to whom the smartcard is uniquely assigned; but in certain contemplated embodiments, can also refer to an animal or a machine (e.g., a robot) to which a smartcard is uniquely assigned.

The term "reader" refers to a device configurable to read data from a smartcard and/or to write data to the smartcard.

System

In some embodiments, the access control information is transmitted between a reader and the smartcard and/or stored on the smartcard in the clear. In other embodiments, the access control information is transmitted between a reader and the smartcard and/or stored on the smartcard as encrypted data. Encrypted access control information with signature helps check for any changes in the access control information and the correctness of the source of the access control information. Similarly, in some embodiments, the credentials are transmitted between a reader and the smartcard and/or stored on the smartcard in the clear. In other embodiments the credentials are transmitted between a reader and the smartcard and/or stored on the smartcard as encrypted data.

Figure 3:
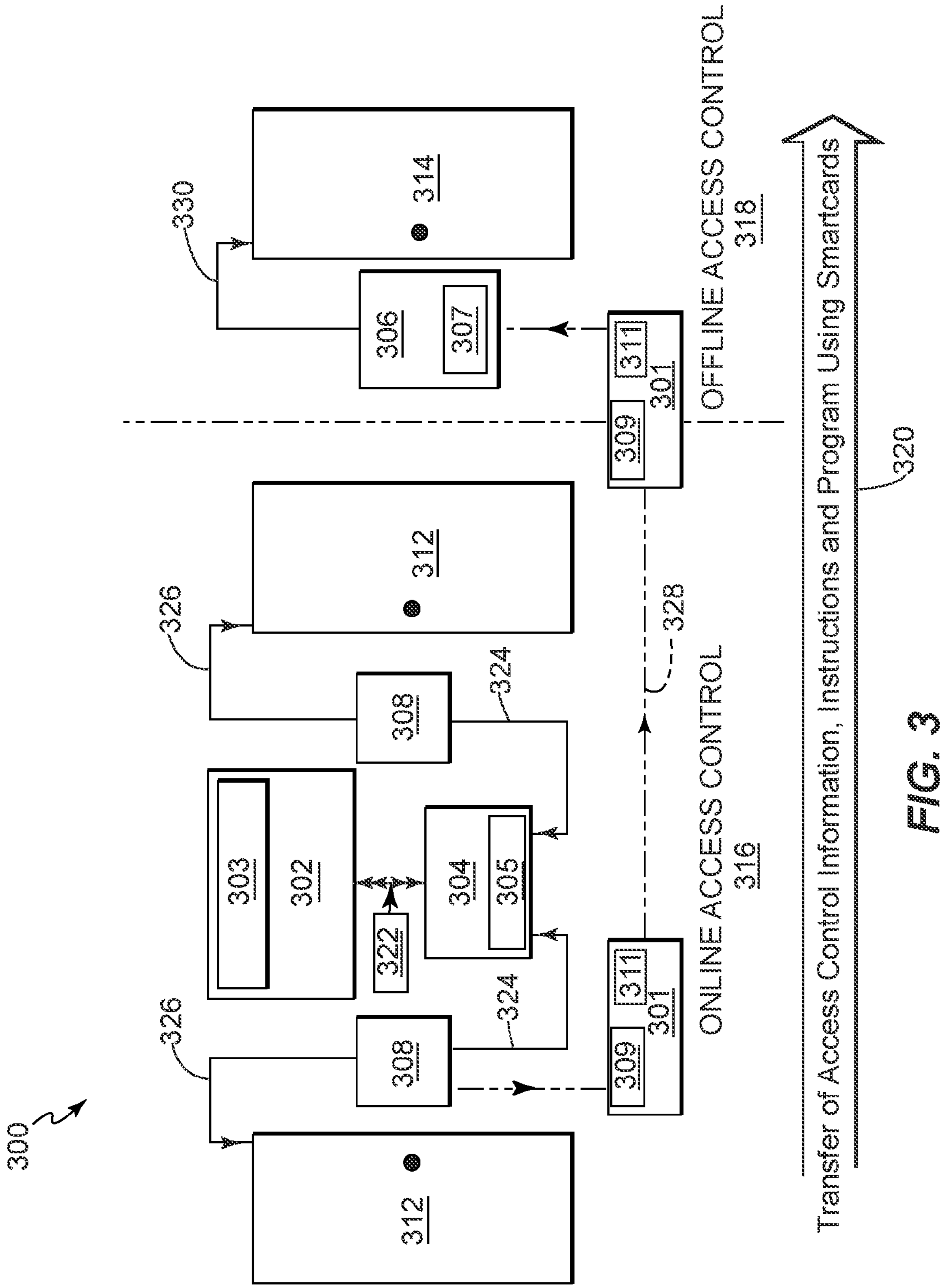
FIG. 3 is a diagram of an embodiment of an improved PACS, which includes an online portion, an offline portion, and an associated smartcard, which is configurable to transport access control information therebetween.

FIG. 3 is a diagram of an embodiment of an improved PACS 300, which includes an online portion 316, an offline portion 318, and an associated smartcard 301, which is configurable to transport access control information and/or credentials between the online portion 316 and the offline portion 318. In the online portion 316 a host computer, or server, 302 stores a master database 303 containing access control information and/or credentials. In an embodiment, the master database 303 stores a revoked list.

A host—controller (e.g., first) communications path 322 links the host computer 302 with an online controller 304, on which is stored a replicated master database 305. The replicated master database 305 is a copy of the master database 303 and is updated either by changes to the master database 303 or by changes made to the smartcard 301 by an offline reader 306. Online controller—reader (e.g., second) communications paths 324 link to the controller 304 with one or more online readers 308. One or more online reader—entry/exit point communications paths 326 link each of the online readers 308 with an entry/exit point 312. In one embodiment each entry/exit point 312 is a door having an electronic lock.

In the offline portion 318 an offline reader 306, which stores an offline reader identifier 307, instead of a copy of the replicated master database 305, is coupled with an offline entry/exit point 314 via an offline reader—entry/exit point (e.g., third) communications path 330.

A specially configured smartcard 301 stores (e.g., carries) and/or transmits access control information 309 between the online portion 316 and the offline portion 318 of the PACS 300. The smartcard 301 also stores (e.g., carries) credentials 311.

In direct contrast to conventional smartcards, which store only smartcard identifiers, embodiments of the invention provide a smartcard 301, which is configurable as an information, data, or program carrying bridge between an online portion 316 of a PACS and its offline portion 318. In further contrast to conventional smartcards, embodiments of the claimed smartcard 301 are configurable to store access control information 309 that is: (i) transmitted from a PACS' online portion 316 to a particular target offline reader 306, (ii) transferred from one offline reader 306 to another, or (iii) transferred from one or more offline readers 306 to the PACS' online portion 316. In an embodiment, this manner of carrying access control information 309 via one or more smartcards for 301 to the target offline readers 306 is used to instruct the offline portion 318 of the PACS 300 to achieve a result, such as, but not limited to: banning an entry, banning an exit, channeling a smartcard holder in a desired direction, locking the smartcard holder in a predetermined area, etc. Embodiments of the smartcard 301 described and claimed herein are configurable to track the movements and identities of the smartcard holder.

In an embodiment of a PACS 300, one or more types of access control information 309 (such as a revoked list) will flow from its online portion 316 to the offline portion 318 of the PACS 300, as indicated by the arrow 320; however, in some embodiments offline reader status information (e.g., another type of access control information 309) will flow from the offline portion 318 to the online portion 316 of the PACS 300.

Access control information 309 is usually available at the online host computer 303 or stored in the replicated master database 305 of an online controller 304; however, in embodiments of a PACS 300, one or more types of access control information 309 can also be transferred to one or more offline readers 306 using the smartcard 301.

For example, in one embodiment where the access control information stored in the master database 303 and/or in the replicated master database 305 comprises both an updated access control list and a revoked list, the access control information 309 stored on the smartcard 301 can be updated as the smartcard 301 (e.g., badge) passes through the online portion 316 of the PACS 300. Thus, as the smartcard holder approaches an online reader 308 located at an entry/exit point 312, the online reader 308 transmits the updated access control list and/or and a revoked list to a memory of the smartcard 301.

In an embodiment, as a smartcard holder approaches an offline reader 306 located at an entry/exit point 314 of an offline portion 318 of the PACS 300, the offline reader 306 powers up and transmits its unique offline reader identifier 307 to the smartcard 301. The smartcard processor (408 in FIG. 5) (i) determines whether access should be granted by comparing the unique offline reader identifier 307 received from the offline reader 306 with a physical access control list stored on the smartcard 301; (ii) transmits a "grant access" signal or a "deny access" signal to the offline reader 306; and (iii) records, in the smartcard's memory (404 in FIG. 5), data about the transaction, i.e., "transactional data," which will be uploaded to the online controller 304 and/or online host computer 303 when the smartcard 301 passes an appropriately configured online reader 308. The smartcard 301 may also record in its memory (404 in FIG. 5) data indicating status information of the offline reader 306. In one embodiment, the smartcard 301 is energized, i.e., powered, by an electric and/or magnetic field emitted by the offline reader 306.

In one embodiment, the smartcard 301 is configurable to send the "grant access" signal or the "deny access" signal to the offline reader 306. This type of proactive smartcard-to-offline reader communication is unique and believed not to have been deployed in a PACS before. In this type of communication, the smartcard 301 proactively sends various types of access control information to the offline reader 306, instead of the offline reader 306 seeking only a smartcard identifier from the smartcard 301. Additionally, in this type of communication, the smartcard 301, and not the offline reader 306, controls (e.g., determines whether to grant or deny) access to the offline entry/exit point 314. That said, the offline reader 306 may, in one embodiment, be configured to supplement the access control decision made by the smartcard 301, by checking a revoked listed stored in a memory of the offline reader 306 to determine whether the revoked list contains the smartcard identifier, and, depending on the results of the comparison, affirming or countermanding the "grant access" signal previously outputted by the smartcard 301.

New and Updated Records

Figure 4:
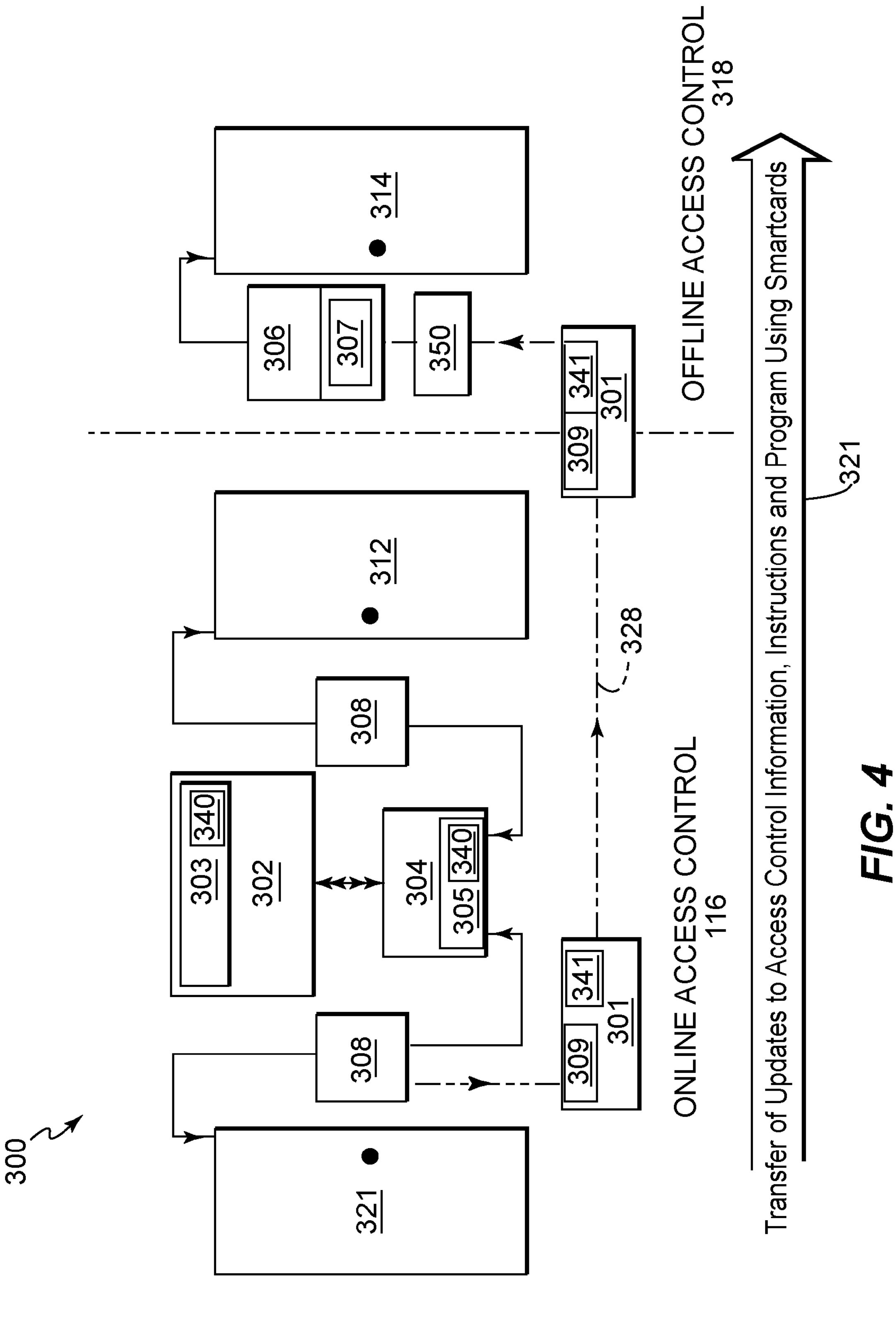
FIG. 4 is another diagram of the embodiment of the PACS of FIG. 3 that shows how records in a master database, in a replicated master database, and in the access control information stored on a smartcard are updated as the smartcard moves, along the path, in the online portion and/or in the offline portion.

FIG. 4 is another diagram of the embodiment of the PACS 300 of FIG. 3 that shows how records in a master database 303, in a replicated master database 305, and in the access control information 309 or in the credentials 311 stored on a smartcard 301 are updated as the smartcard 301 moves, along the path 328, in the online portion 316 and/or in the offline portion 318. For example, in one embodiment an operator of the PACS 300 manually creates or updates a record 340 in the master database 303. The new or updated record 340, which may create or change either access control information or credentials, is transferred to the replicated database 305, which is stored on the online controller 304. Thereafter, as the smartcard 301 passes an appropriately configured online reader 308, the smartcard 301 reads the updated record 340 and stores it in a memory of the smartcard 301 as updated record 341. Alternatively, the online reader 308 writes the new or updated record 340 to the smartcard 301, which stores the new or updated record 340 in the memory of the smartcard 301 as a new or updated record 341. Thereafter the smartcard 301 is carried along the path 328 to the offline portion 318 of the PACS 300. The smartcard 301 will use the stored new or updated record 341 when interacting with an offline reader 306 to determine a smartcard holder's access rights to an offline entry/exit point 314 coupled with the offline reader 306. Depending upon whether the new or updated record 341 grants or revokes access to the offline reader 306 and the offline entry/exit point 314, the smartcard 301 will signal 350 the offline reader 306 to unlock (or lock) the offline entry/exit point 314.

In FIG. 4, arrow 321 depicts the direction of communication flow for new or updated access control information and/or credentials that originates in the online portion 316 of the PACS 300 and is carried by the smartcard 301 to the offline portion 318 of the PACS 300. Alternatively, as explained below, the direction of communication flow is reversed for updated data that originates in the offline portion 318 of the PACS 300 and is carried by the smartcard 301 to the online portion 316 of the PACS 300.

Examples of updated data that originates in the offline portion 318 of the PACS 300 comprise, but are not limited to: transactional information and offline-reader status information.

In one embodiment, transactional information comprises a record of an event that occurs within the PACS 300. Depending on the embodiment, an event comprises one or more of: granting access, denying access, a change of access conditions, an indication of attempted—but unauthorized—access, and the like. In an embodiment, the updated record 341 stored in a memory of the smartcard 301 comprises updated transactional information.

In one embodiment, offline-reader status information comprises a record of an offline-reader's last-transmitted operational status. For example, in another embodiment, the offline reader 306 transmits updated data (e.g., offline reader status information) to the smartcard 301, which stores the updated data received from the offline reader 306 as an updated record 341. Thereafter the smartcard 301 moves along the path 328 to the online portion 318 of the PACS 300. As the smartcard 301 passes an appropriately configured online reader 308, the smartcard 301 the updated record 341 is transmitted to or read by the online reader 308. The updated data from the offline reader 306 is then stored as updated record 340 in both the replicated master database 305 and in the master database 303.

System Components and Subcomponents

Figure 5:
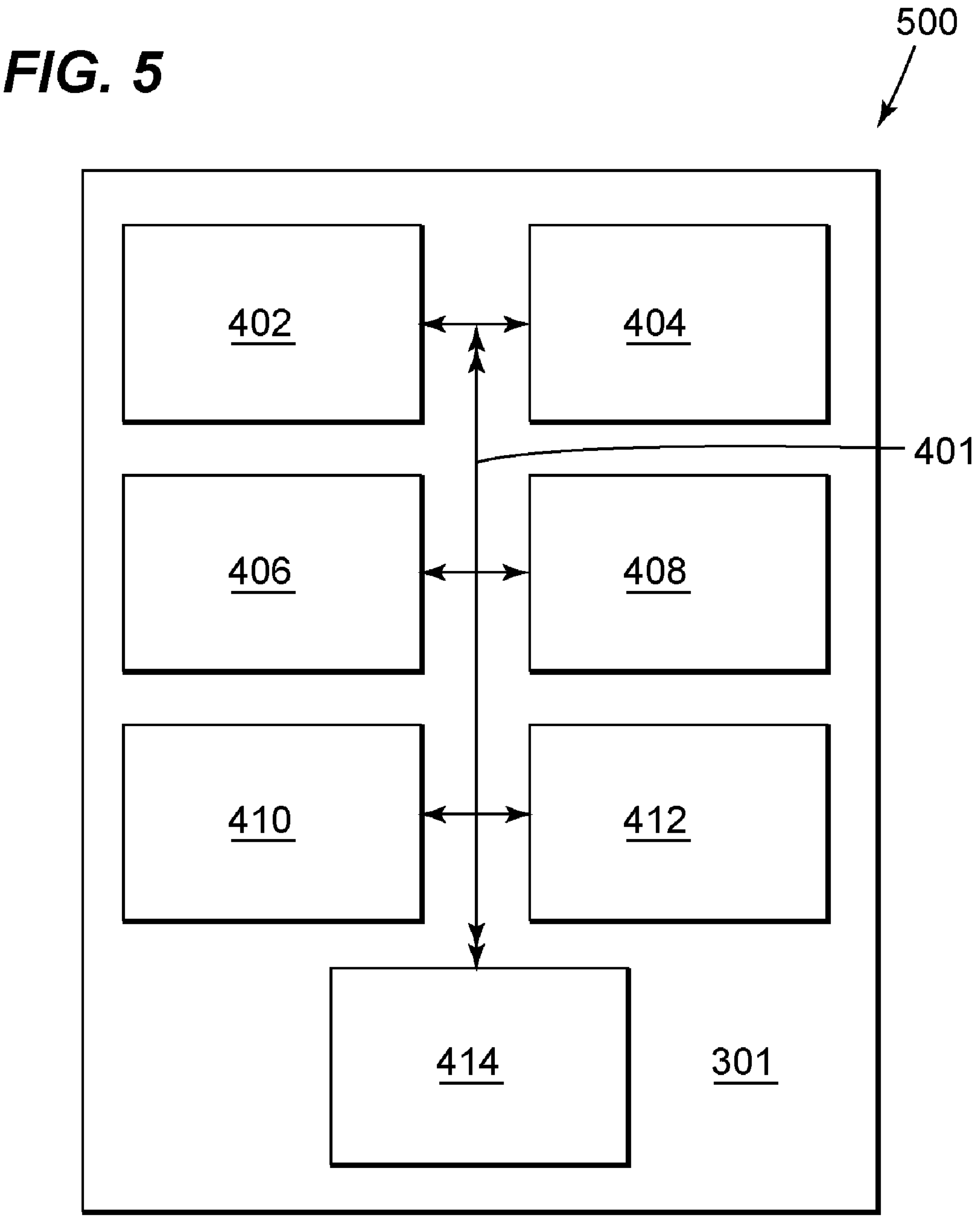
FIG. 5 is a block diagram illustrating components that may be included in an embodiment of a smartcard configurable to interact with an embodiment of the PACS of FIGS. 3 and 4.

FIG. 5 is a block diagram illustrating components that may be included in an embodiment of a smartcard 301 configurable to interact with an embodiment of the PACS 300 of FIGS. 3 and 4. By way of example and not limitation, an embodiment of the smartcard 301 comprises a data bus 401 to which are coupled a volatile memory 402, a non-volatile memory 404, an optional cryptography coprocessor 406, a computer processor 408, a power supply 410, a clock 412, and an input/output interface 414, which may be either contact or contactless. All of the components 402, 404, 406, 408, 410, 412, and 414, are not necessary for each and every embodiment of the invention. For example some smart cards 301 may include the cryptography coprocessor 406, while other smart cards 301 may not. Additionally some smart cards 301 may have a contact input/output interface, while other smart cards 301 may have a contactless input/output interface. Still other smart cards 301 may have a dual input/output interface.

Referring to FIGS. 3 and 5, in one embodiment, the computer processor 408 controls access to an offline entry/exit point 314. The computer processor 408 is configurable to receive an offline reader identifier 307 from an offline reader 306. The computer processor 408 may be further configurable to compare the received reader identifier 307 to access control information 309 stored in the memory 402,404 of the smartcard 301. The computer processor 408 may be further configurable to determine an access privilege associated with the reader identifier 307. The computer processor 408 may be further configurable to match the determined access privilege with credentials stored in the memory 402,404 of the smartcard 301. The computer processor 408 may be further configurable to output a signal 350 to the offline reader 306 that causes the offline reader 306 to grant or deny access to an entry/exit point 314.

Figure 6:
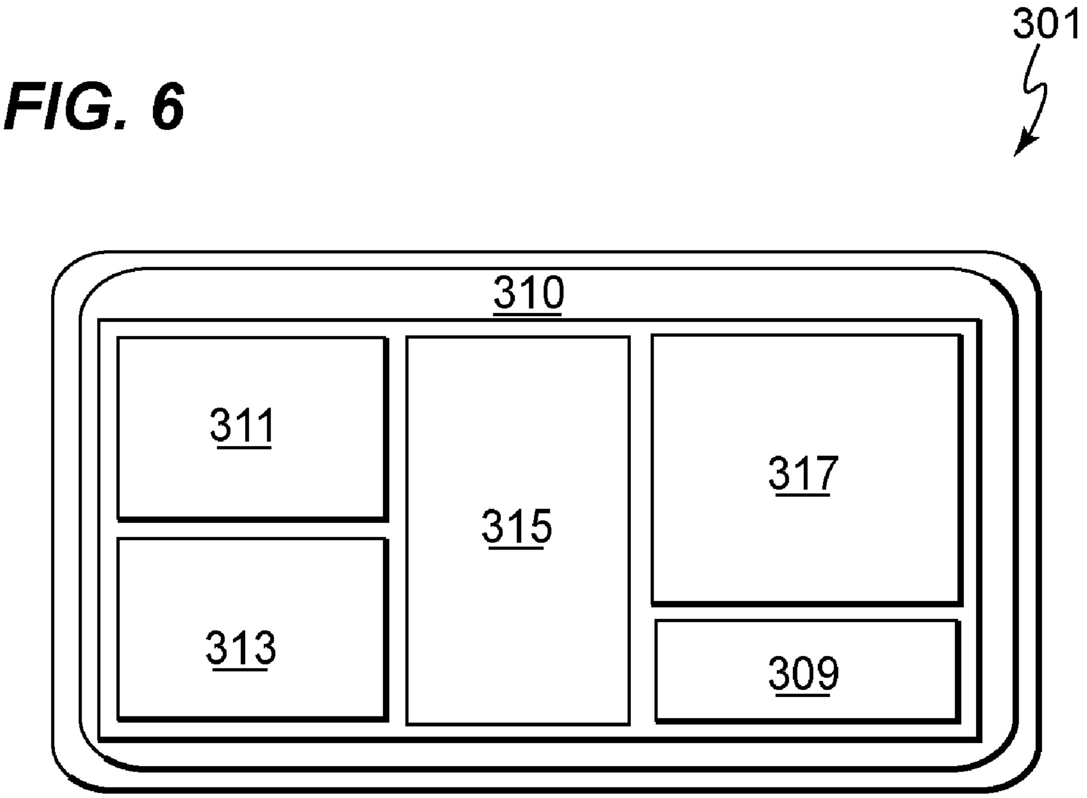
FIG. 6 is a block diagram illustrating types of data stored by the embodiment of the smartcard of FIG. 5.

FIG. 6 is a block diagram illustrating types of smartcard data 310 stored by the embodiment of the smartcard 301 of FIG. 5. In an embodiment the smartcard data 310 comprises credentials 311, other data 313, card programs, byte code, and executables 315, offline command/data/instructions 317 (e.g., programs, byte codes and executables for other targets including online and offline readers (updates/reload)), and access control information 309 (e.g., a physical access control list and its updates).

Figure 7:
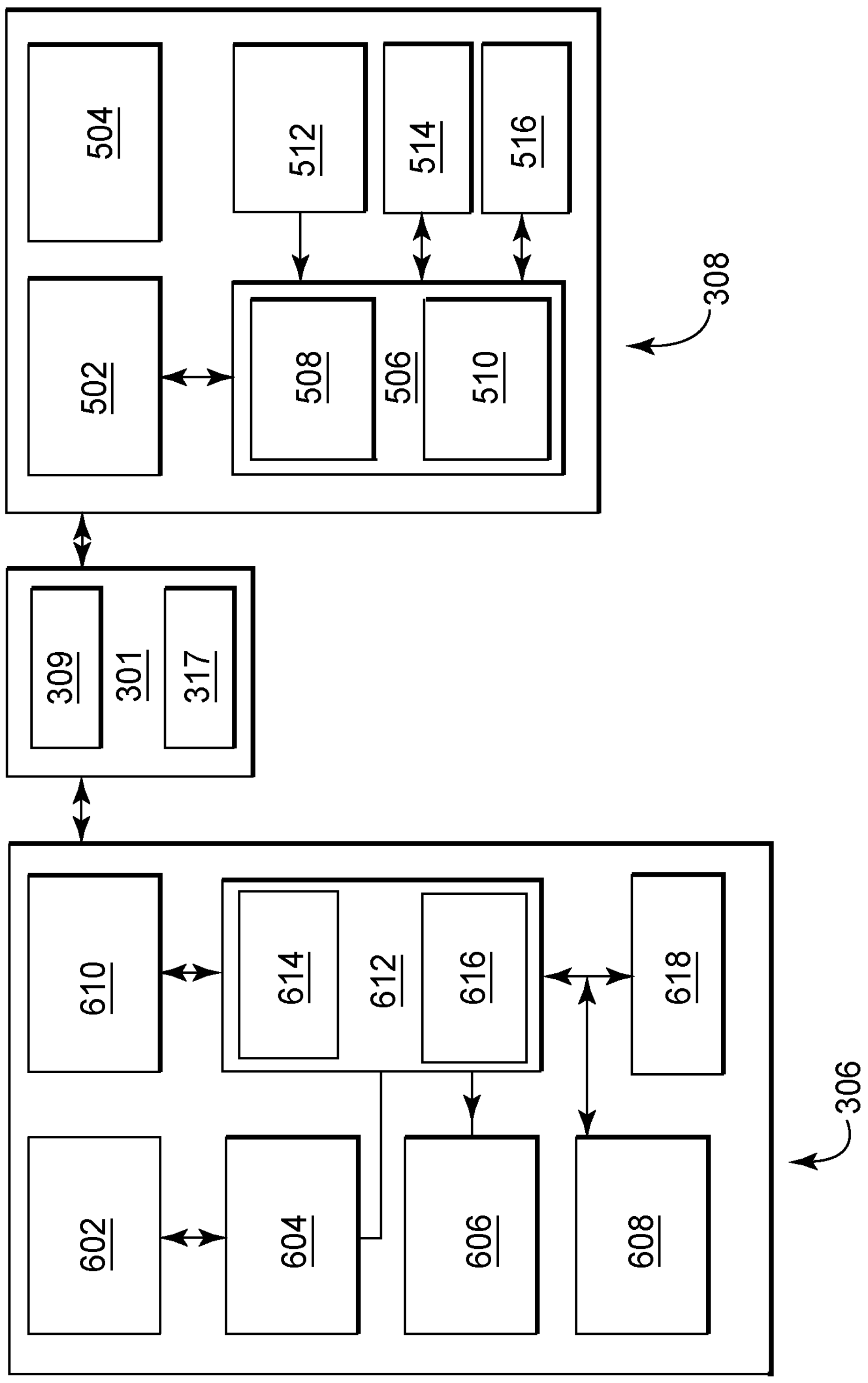
FIG. 7 is a block diagram illustrating components of an online reader and an offline reader.

FIG. 7 is a block diagram illustrating components of a smartcard 301, an online reader 308, and an offline reader 306 of FIG. 3. As previously mentioned the smartcard 301 comprises access control information 309 and offline command/data/instructions 317. In an embodiment an offline reader 306 comprises an access control database 602, a database update logic 604, an offline door control 606, an offline clock/real-time clock 608, an offline card communication interface space (reader/writer), an offline reader computer processor 612, and offline command/data/instructions interpreter 614, and access control list manager 616, and an offline reader non-volatile/volatile memory 618. In an embodiment, an online reader 308 comprises an online card communication interface space (reader/writer), an online controller communication interface 504, an online reader computer processor 506, an entry/exit point controller 512, an online reader volatile memory 514, an online reader non-volatile memory 516.

Methods—Creating or Updating Record Stored in Memory of Smartcard

Figure 8A:
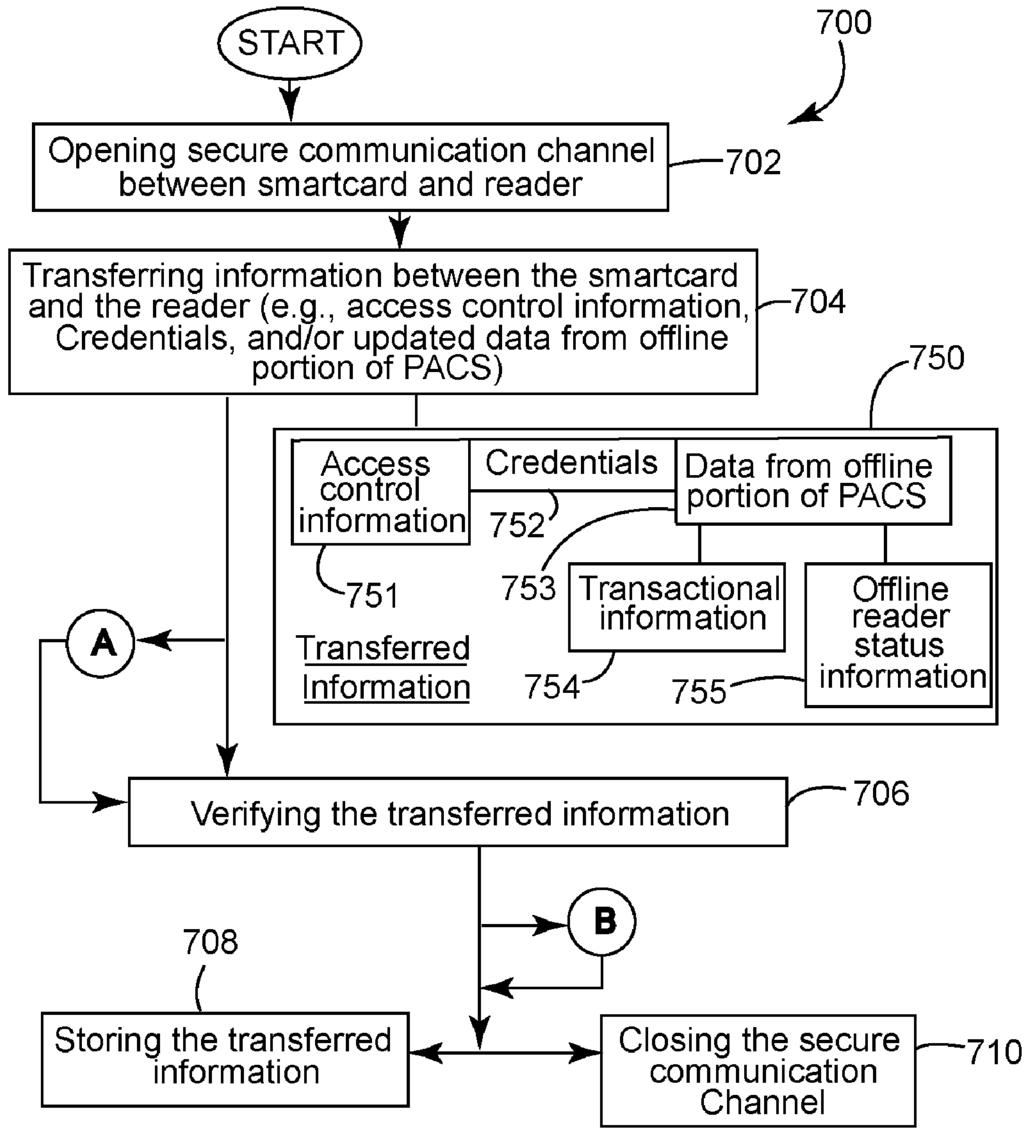
FIGS. 8A, 8B, and 8C are block diagrams, that taken together, illustrate a method of updating an access control list on a smartcard.
Figure 8B:
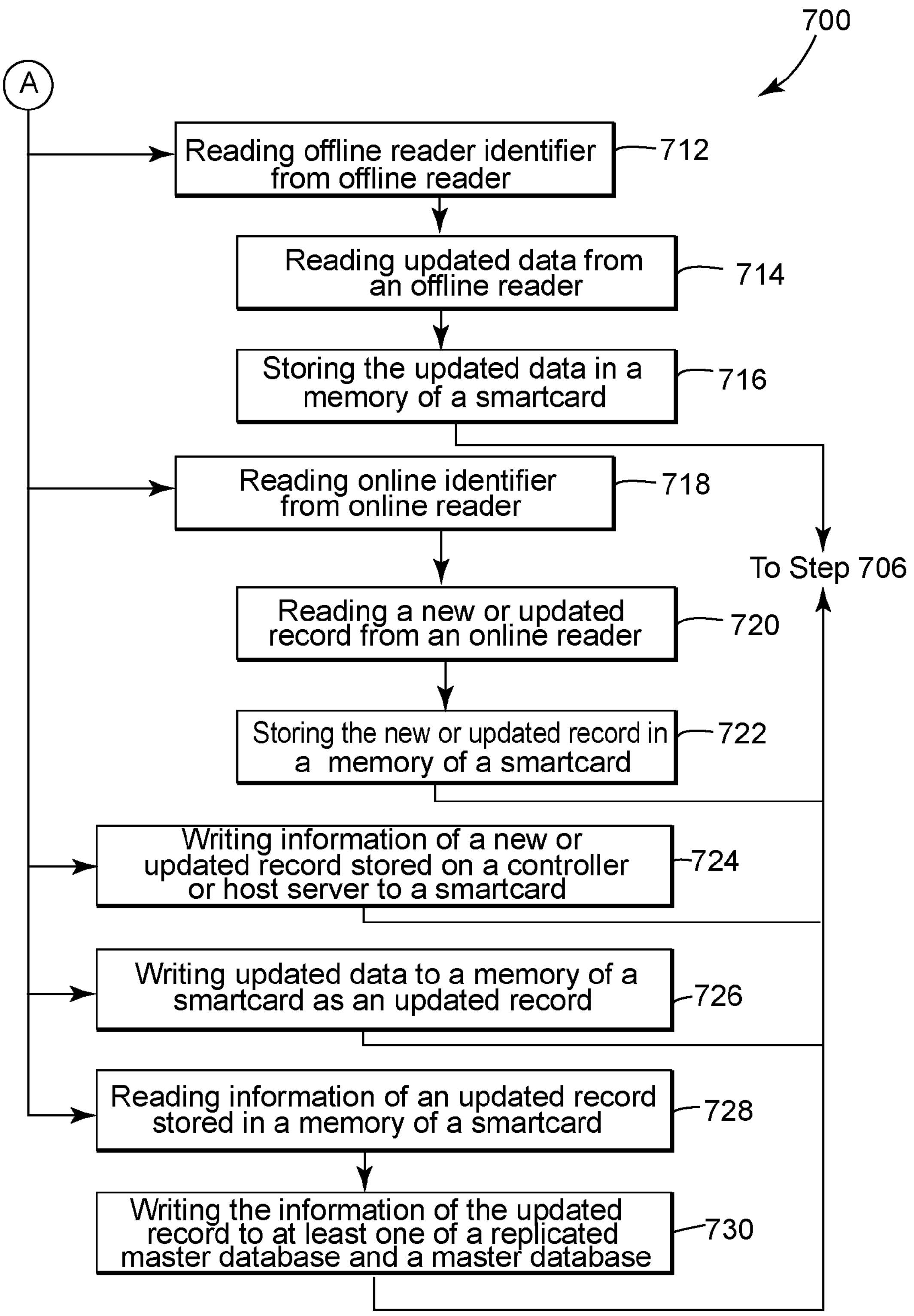
Figure 8C:
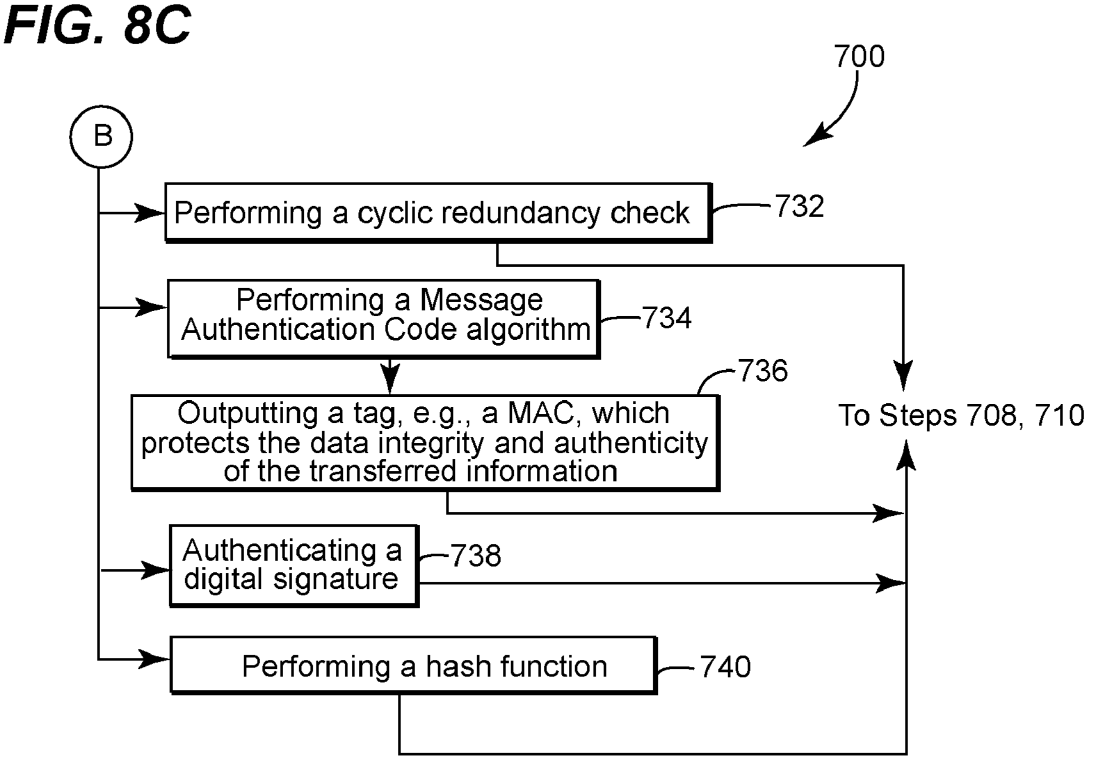

FIGS. 8A, 8B, and 8C are a block diagram illustrating an embodiment of a method 700 of creating or updating a record 341 on a smartcard 301.

Referring to FIGS. 3, 4, and 8A, the method 700 comprises opening 702 a secure communication channel between the smartcard 301 and one of an online reader 308 and an offline reader 306. In one embodiment, the step of opening 702 a secure communication channel is initiated by the smartcard 301. In another embodiment, the step of opening 702 a secure communication channel is initiated by a reader. The reader may be either an offline reader 306 or an online reader 308.

The method 700 further comprises transferring 704 information between the smartcard 301 and the online reader 308 or between the smartcard 301 and the offline reader 306 over the secure communication channel.

In an embodiment, information transferred between the online reader 308 and the smartcard 301, e.g., "transferred information 750," comprises new or updated access control information 751, new or updated credentials 752, and/or updated data 753 from an offline portion 318 of the PACS 300.

In an embodiment, information transferred between the smartcard 301 and the offline reader 306, e.g., "transferred information 750," comprises, an offline-reader identifier, new or updated access control information, and/or updated data 753 from an offline portion 318 of the PACS 300. The updated data 753 from an offline portion 318 of the PACS 300 comprises transactional information 754 and/or offline-reader status information 755.

The transferred information 750 may be encrypted (by the cryptography co-processor 406 of FIG. 5) or may be unencrypted. The transactional information may comprise one or more timestamps, which term is defined below.

The method 700 further optionally comprises verifying 706 the transferred information 750.

The method 700 further optionally comprises storing 708 the transferred information 750 and/or closing 710 the secure communication channel. In an embodiment, the transferred information 750 is stored on the smartcard 301, e.g., in a memory of the smartcard 301. In another embodiment, the transferred information 750 is stored on a controller 104, e.g., in a replicated master database 305. In one embodiment, the transferred information 750 is stored on a host server 302, e.g., in a master database 303.

Method—Smartcard

Referring now to FIGS. 3, 4, 8A, and 8B, in one embodiment, the step of transferring 704 information is performed by the smartcard 301 and comprises reading 712 an offline reader identifier 307 from an offline reader 306. In the same embodiment, the step of transferring 704 information is performed by the smartcard 301 and comprises reading 714 updated data, e.g., transactional information and/or offline-reader status information, from an offline reader 306. In the same embodiment, the step of transferring 704 information is further performed by the smartcard 301 and further comprises storing 716 the updated data in a memory of the smartcard 301 as updated record 341.

In the same embodiment, the step of transferring 704 information is further performed by the smartcard 301 and further comprises reading 720 a new or updated record 340 from an online reader 308. In the same embodiment, the step of transferring 704 information is further performed by the smartcard 301 and further comprises storing 722 the updated record 340 in a memory of the smartcard 301 as new or updated record 341. In this embodiment, the new or updated record 340 may comprise new or updated access control information and/or new or updated credentials.

Method—Online Reader

Referring still to FIGS. 3, 4, 8A, and 8B, in one embodiment, the step of transferring 704 information is performed by the online reader 308 and comprises writing 724 information of a new or updated record 340, stored on a controller 304, e.g., in a replicated master database 305, and/or on a host server 302, e.g., in a master database 303, to the smartcard 301 as an updated record 341.

Method—Offline Reader

Referring still to FIGS. 3, 4, 8A, and 8B, in another embodiment, the step of transferring 704 information is performed by the offline reader 306 and comprises writing 726 updated data, comprising transactional information and/or offline-reader status information, to a memory of the smartcard 301 as an updated record 341.

Method—Online Reader

Referring still to FIGS. 3, 4, 8A, and 8B, in another embodiment, the step of transferring 704 information is performed by the online reader 308 and comprises reading 728 information of an updated record 341 stored in a memory of the smartcard 301. In the same embodiment, the step of transferring 704 information is further performed by the online reader 308 and further comprises writing 730 the information of the updated record 341 to at least one of the replicated master database 305 and the master database 303 as an updated record 340.

Other Method Embodiments

As mentioned above, the method 700 further optionally comprises verifying 706 the transferred information 750.

Referring now to FIGS. 3, 4, 8A, 8B, and 8C, in one embodiment, the step of verifying 706 the transferred information comprises performing 732 a cyclic redundancy check ("CRC"), which is a type function that takes as input a data stream of any length and produces as output a value of a certain space, commonly a 32-bit integer. In one embodiment, the CRC is performed as a checksum to detect alteration of the transferred information.

In an embodiment where the transferred information 750 is encrypted, the step of verifying 706 the transferred information comprises performing 734 a Message Authentication Code ("MAC") algorithm, and outputting 736 a tag, e.g., a MAC, which protects the data integrity and authenticity of the transferred information.

In one embodiment, the step of verifying 706 the transferred information comprises authenticating 738 a digital signature. A digital signature scheme typically comprises a key generation algorithm, a signature algorithm, and a verification algorithm.

In one embodiment, the step of verifying 706 the transferred information comprises performing 740 a hash function, which is a mathematical function for converting data into a relatively small integer.

Method—Offline Access Control

Figure 9:
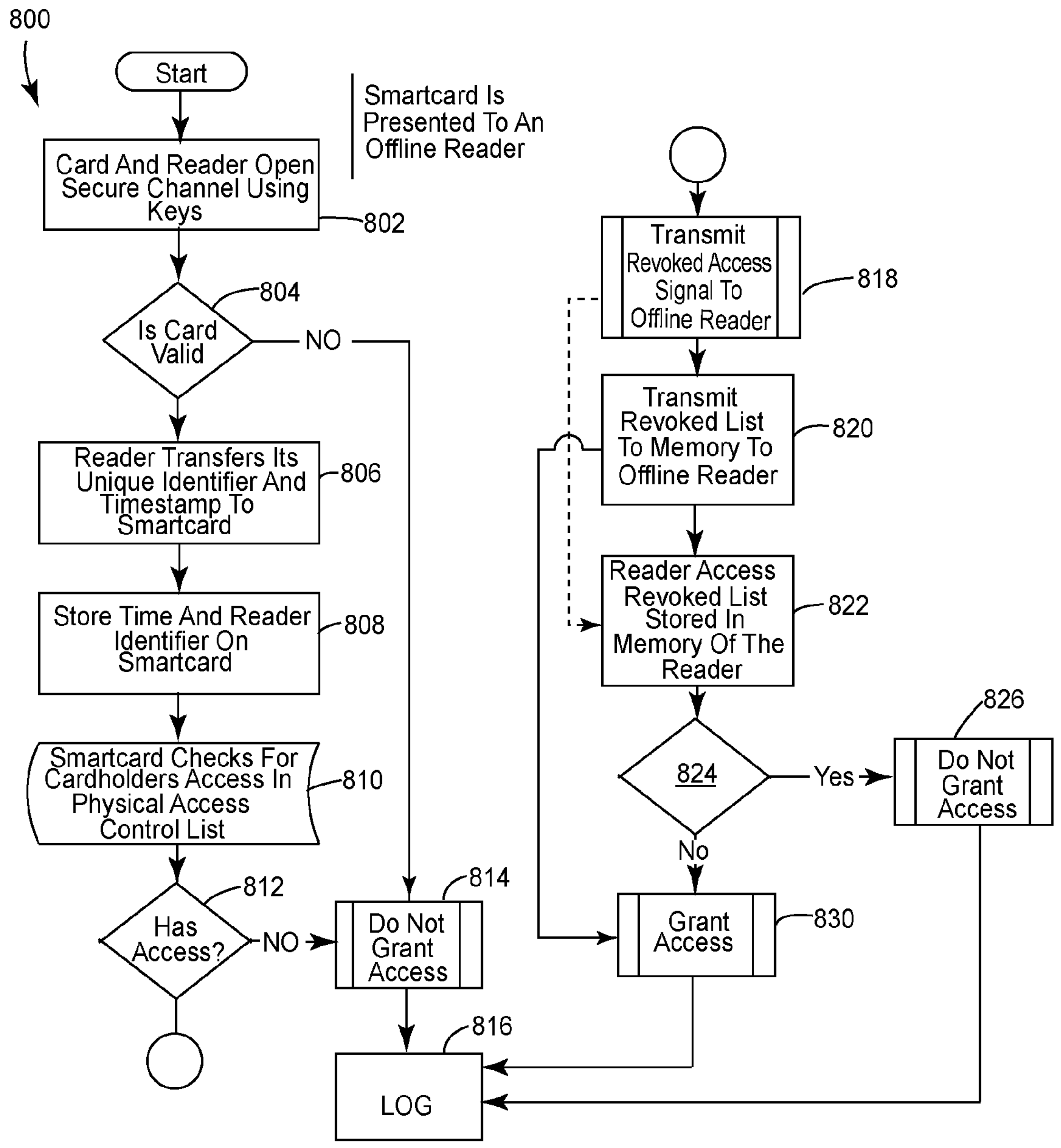
FIG. 9 is a flowchart illustrating a method of performing an offline access control transaction.

FIG. 9 is a flowchart illustrating an embodiment of a method 800 of performing an offline access control event using a smartcard 301 in the PACS 300 of FIG. 3. Referring to FIGS. 3 and 9, to begin a smartcard 301 is presented to an offline reader 306. The method 800 comprises opening 802 a secure communication channel between the smartcard 301 and the offline reader 306 using one or more cryptographic keys. Any transferred information or other transactions may be encrypted (by the cryptography co-processor 406 of FIG. 5) or may be unencrypted. The method 800 may further comprises determining 804 whether the smartcard 301 is valid.

If the smartcard 301 is determined not to be valid, the method 800, the method may further comprise denying 814 access to the offline entry/exit point 314. The method 800 may further comprise logging, transmitting, or storing 816 transactional information. The transactional information may be logged to the offline reader 306, transmitted by the offline reader 306 to the smartcard 301, and stored on the smartcard 301.

If the smartcard 301 is determined to be valid, of the method 800 may further comprise transferring 806 the offline reader identifier (307 in FIG. 3) and timestamp to the smartcard 301. The term "timestamp" refers to calendar and/or time data indicating the date and/or time that a reader/smartcard event occurred. The method 800, may further comprise storing 808 the offline reader identifier in a memory of the smartcard 301. The step 808 may also comprise storing a timestamp in a memory of the smartcard 301. In an embodiment, the method 800 may further comprise checking 810 for the offline reader identifier in access control information (e.g., a physical access control list) previously stored on the smartcard 301.

The method 800 may further comprise determining 812 the access privileges, if any, associated with the smartcard holder identifier and the received offline reader identifier. If no access privileges exist, the method 800 may further comprise denying 814 access to the offline entry/exit point 314 and/or logging, transmitting, or storing 816 transactional information. The transactional information may be logged to the offline reader 306, transmitted by the offline reader 306 to the smartcard 301, and stored on the smartcard 301. If access privileges exist, the method 800 may further comprise sending 818 a "grant access" signal to the offline reader 306.

In an embodiment, where the smartcard 301 acts as a carrier of a revoked list, the method 800 may further comprise transmitting 820 the revoked list from the smartcard 301 to the offline reader 306. A non-limiting example of a revoked list is a revoked badge list. In an embodiment, a revoked list is a listing of smartcard identifiers and offline reader identifiers for which previously granted access privileges have been revoked, that a smartcard 301 carries between an online reader 308 and an offline reader 208. In embodiments, the revoked list carried by the smartcard 301 contains only the smartcard identifiers of other smartcards.

In an embodiment, a memory of the smartcard 301 receives the revoked list from an online reader 308 as the smartcard 301 moves through the online portion of the PACS. Thereafter, as the smartcard 301 moves through the offline portion of the PACS, it transfers (e.g., sends) 820 the revoked list to a memory of each offline reader 306 to which it is presented. In this manner, the revoked list is distributed to one or more offline readers 306 by smartcard holders passing between the online portion 316 and offline portion 318 of the PACS 300. A benefit of this approach is that a smartcard holder who accesses only offline readers 306 for a prolonged period of time (e.g., rarely, if ever, accesses an online reader 308), will have their access privileges revoked more quickly than if their access privileges were revoked only when that particular smartcard holder accessed an online reader 308.

Once the smartcard 301 has transmitted (e.g., sent) the revoked list to the offline reader 306, the method 800 may further comprise granting access 830 to the offline entry/exit point.

In another embodiment, where the smartcard 301 does not act as a carrier of a revoked list, the method 800 proceeds from step 820 (transmitting a "grant access" signal to the offline reader 306) to accessing 822 the revoked list. The method 800 further comprises the offline reader 208 determining 824 whether the smartcard identifier is on the revoked list. If the smartcard identifier appears on the revoked list, the method 800 further comprises the offline reader denying access 828 to the offline entry/exit point 314. If the smartcard identifier does not appear on the revoked list, the method 800 further comprises affirming the previous "grant access" signal received from the smartcard 301 (e.g., may comprise granting 830 access to the offline entry/exit point 314). Granting 830 access may comprise outputting a signal from the offline reader 306 to the offline entry/exit point 314 that opens the offline entry/exit point 314.

In one embodiment, the method 800 may further comprise determining 824 whether the revoked list stored in the offline reader 306, can be verified. Examples of various techniques that can be used to verify the revoked list stored in the offline reader 306 include, but are not limited to: CRC, MAC, hash, and authentication of a digital signature, as described above. If the revoked list stored in the offline reader 306 is verified, the method 800 may further comprise outputting 830 a signal from the offline reader 306 to the offline entry/exit point 314 that opens the offline entry/exit point 314. If not the method 800 may further comprise countermanding the previous "grant access" signal received from the smartcard 301 (e.g., may comprise denying 828 access to the offline entry/exit point 314).

Following either step 828 or step 830, the method 800 may further comprise logging 816 transactional information to the offline reader 306 and/or transmitting, or writing, the transactional information to a memory of the smartcard 301.

Figure 10:
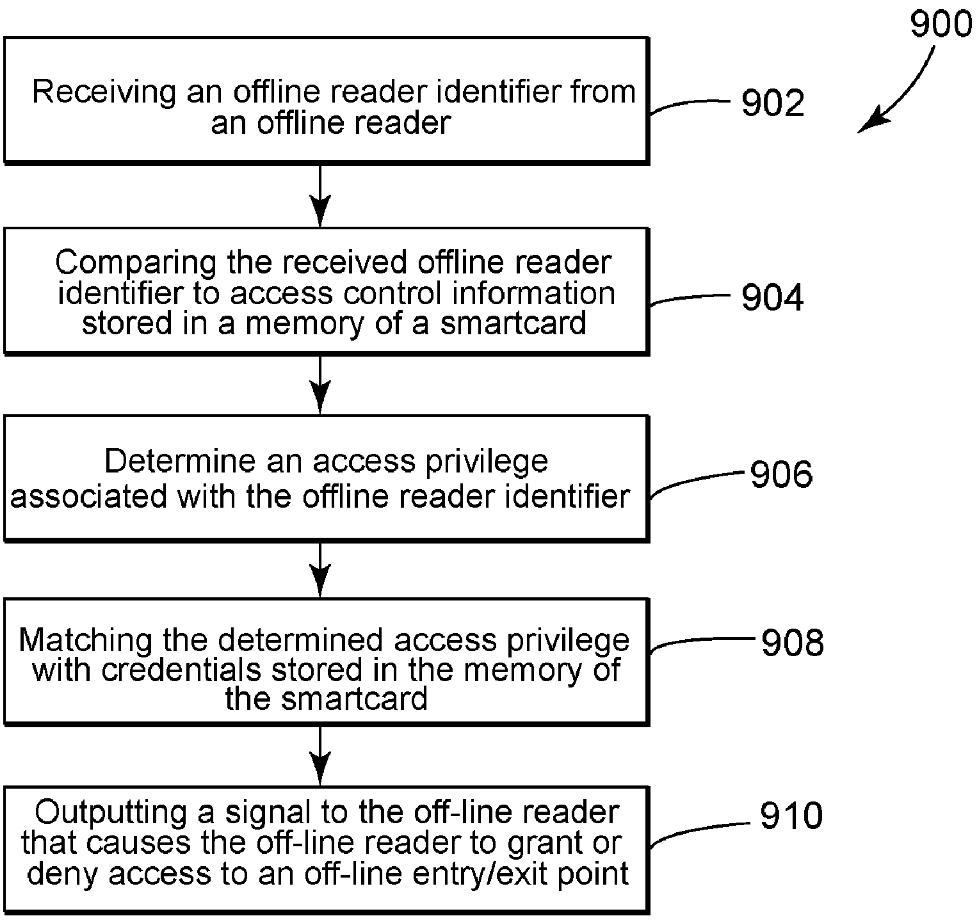
FIG. 10 is a diagram of another method of operating a physical access control system.

FIG. 10 is a diagram of another method 900 of operating a physical access control system. Referring to FIGS. 3, 4, and 10, the method 900 comprises receiving 902 an offline reader identifier 307 from an offline reader 306. The method 900 may further comprise comparing 904 the received offline reader identifier 307 to access control information 309 stored in the memory 402,404 of the smartcard 301. The method 900 may further comprise determining 906 an access privilege associated with the offline reader identifier 307. The method 900 may further comprise matching 908 the determined access privilege with credentials stored in the memory 402, 404 of the smartcard 301. The method 900 may further comprise outputting 910 a signal 350 to the offline reader 306 that causes the offline reader 306 to grant or deny access to an entry/exit point 314.

Each step, or combination of steps, depicted in FIGS. 8A, 8B, 8C, 9, and 10 can be implemented by computer program instructions. These computer program instructions may be loaded onto, or otherwise executable by, a computer or other programmable apparatus to produce a machine, such that the instructions, which execute on the computer or other programmable apparatus create means or devices for implementing the functions specified in the block diagram. These computer program instructions may also be stored in a computer-readable memory that can direct a computer or other programmable apparatus to function in a particular manner, such that the instructions stored in the computer-readable memory produce an article of manufacture, including instruction means or devices which implement the functions specified in FIGS. 8A, 8B, 8C, 9, and 10. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in FIGS. 8A, 8B, 8C, 9, and 10.

Non-limiting examples of "memory" or "computer readable memory" are: random access memory, read only memory, cache, dynamic random access memory, static random access memory, flash memory, virtual memory, and the like.

A smartcard's dimensions and shape will very depending on the embodiment, but by way of example only, may approximate the shape, and one or more dimensions, of either a credit card or a hardware token.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A physical access control system comprising:

an online portion including a controller and an online reader connected to the controller;

an offline portion including an offline reader and an entry/exit point;

a smartcard configured to communicate and transfer information with the online reader and offline reader, the smartcard including a computer processor and memory coupled with the computer processor;

wherein the computer processor is configured to:

compare an offline reader identifier received from the offline reader to access control information stored in the memory;

determine an access privilege associated with the offline reader identifier;

match the determined access privilege with credentials stored in the memory of the smartcard; and output a signal to the offline reader that requests the offline reader to grant or deny access to the entry/exit point; and wherein the offline reader is configured to determine whether to grant or deny access based upon whether a smartcard identifier associated with the smartcard is on a revoked list.

2. The physical access control system of claim 1, wherein the offline reader identifier comprises a unique reader identifier that includes one or more of an organization identifier, a country/region identifier, a city/county identifier, a facility identifier, a subfacility identifier, a building identifier, a zone identifier, and a door identifier.

3. The physical access control system of claim 2, wherein the access control information comprises an updated version of a revoked list.

4. The physical access control system of claim 2, wherein the access control information comprises offline reader status information.

5. A physical access control system of claim 1, wherein the smartcard is configured to:

transmit a revoked list stored in the memory from the smartcard to the offline reader.

6. The physical access control system of claim 1, wherein the offline reader is configured to:

deny access to the entry/exit point if the revoked list contains the smartcard identifier; and grant access to the entry/exit point if the smartcard identifier does not appear on the revoked list.

7. The physical access control system of claim 1, wherein the offline reader is configured to transfer at least one of transactional information and status information to the smartcard.

8. A method comprising:

receiving, at a smartcard having a processor and a memory, a reader identifier from an offline reader;

comparing the received reader identifier to access control information stored in the memory of the smartcard;

determining an access privilege associated with the reader identifier;

matching the determined access privilege with credentials stored in the memory of the smartcard;

outputting a signal to the offline reader requesting the offline reader to grant or deny access to an entry/exit point; and determining, at the offline reader, whether to grant or deny access to the entry/exit port based upon whether a smartcard identifier associated with the smartcard is on a revoked list.

9. The method of claim 8 and further comprising:

opening a secure communication channel between the smartcard and the offline reader using one or more cryptographic keys;

transferring the smartcard identifier from smartcard to the offline reader;

determining whether the smartcard is valid; and transferring the offline reader identifier from the offline reader to the smartcard.

10. The method of claim 8 and further comprising:

storing the offline reader identifier on the smartcard;

checking for the offline reader identifier in access control information previously stored on the smartcard;

determining access privileges, if any, associated with the smartcard identifier and the received offline reader identifier; and if no access privileges exist, denying access to an entry/exit point.

11. The method of claims 8 and further comprising:

logging transactional information to a memory of the smartcard.

12. The method of claim 8 and further comprising:

transmitting a revoked list stored in the smartcard from the smartcard to the offline reader.

13. The method of claim 8 and further comprising:

accessing a revoked list stored in a memory of the offline reader.

14. The method of claim 8 and further comprising:

transmitting at least one of transactional information and status information from the offline reader to the smartcard.

15. The method of claim 8 and further comprising:

transmitting information received by the smartcard from the offline reader to an online reader.

* * * * *